(12) United States Patent
Simone et al.

(10) Patent No.: US 7,550,194 B2
(45) Date of Patent: Jun. 23, 2009

(54) LOW COLOR POLYIMIDE COMPOSITIONS USEFUL IN OPTICAL TYPE APPLICATIONS AND METHODS AND COMPOSITIONS RELATING THERETO

(75) Inventors: Christopher Dennis Simone, Pickerington, OH (US); Brian C. Auman, Pickerington, OH (US); Peter Francis Carcia, Wilmington, DE (US); Richard A. Wessel, Raleight, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 554 days.

(21) Appl. No.: 11/195,902

(22) Filed: Aug. 3, 2005

(65) Prior Publication Data

US 2008/0138537 A1 Jun. 12, 2008

(51) Int. Cl.
*B32B 27/00* (2006.01)

(52) U.S. Cl. .............. 428/220; 428/328; 428/330; 428/331; 428/337; 428/339; 428/473.5

(58) Field of Classification Search ........... 428/220, 428/328, 337, 473.5, 330, 331, 339
See application file for complete search history.

(56) References Cited

U.S. PATENT DOCUMENTS

| 4,851,505 A | 7/1989 | Hayes |
|---|---|---|
| 4,912,197 A | 3/1990 | Hayes |
| 5,145,999 A | 9/1992 | Auman et al. |
| 5,177,176 A | 1/1993 | Auman et al. |
| 5,280,103 A | 1/1994 | Auman et al. |
| 5,286,841 A | 2/1994 | Auman et al. |
| 5,322,917 A | 6/1994 | Auman et al. |
| 5,344,916 A | 9/1994 | Harris et al. |
| 5,480,964 A | 1/1996 | Harris et al. |
| 5,520,845 A | 5/1996 | Auman et al. |
| 5,580,950 A | 12/1996 | Harris et al. |
| 6,139,926 A | 10/2000 | Auman et al. |
| 6,348,245 B1 | 2/2002 | Auman et al. |
| 2005/0221023 A1 * | 10/2005 | Sakamoto et al. ............ 428/1.3 |

OTHER PUBLICATIONS

Swiatoslaw Trofimenko et. al., Polyimides Based on 9,9-Disubstituted Xanthene Dianhydrides, Macromolecules, 1994, pp. 1136-1146, vol. 27.

* cited by examiner

*Primary Examiner*—D. S Nakarani

(57) ABSTRACT

Perfluorinated polyimides (and co-polyimide) compositions, particularly films are disclosed, comprising at least 50 mole percent of a polymeric repeat unit derived from contacting 3,3',4,4'-biphenyltetracarboxylic dianhydride (BDPA) and 2,2'-bis(trifluoromethyl) benzidine (TFMB) monomers. The perfluorinated polyimide (and co-polyimide) films of the invention have an in-plane coefficient of thermal expansion (CTE) between −5 and +20 ppm/° C. and a average light transmittance percent of from about 65.0 to about 99.0 (on a 75-micron thick film basis). The films of the present invention were converted to a polyimide using a chemical conversion method instead of typically employed thermal conversion step thus yielding these desirable properties. The films of the present invention can be an excellent substrate in an optical display device and can be used to replace rigid glass substrates. Finally, the polyimide films of the invention can also be used to manufacture flexible display devices (e.g., cellular phones, personal digital assistants, portable video games, laptops, and the like).

13 Claims, No Drawings

LOW COLOR POLYIMIDE COMPOSITIONS USEFUL IN OPTICAL TYPE APPLICATIONS AND METHODS AND COMPOSITIONS RELATING THERETO

FIELD OF THE INVENTION

The present invention relates generally to relatively clear (low color) polyimide-based films having good light transmittance and low in-plane CTE (coefficient of thermal expansion). More specifically, the compositions of the present invention are directed to a perfluoronated polyimide, useful in glass-type applications, particularly in the field of electronic displays.

BACKGROUND OF THE INVENTION

U.S. Pat. No. 5,071,997 discloses a class of polyimides useful in low color film applications. However, these polyimides can have a relatively high coefficient of thermal expansion (CTE), and a relatively low glass transition temperature (Tg), generally making them a poor choice as a high performance replacement for glass. U.S. Pat. Nos. 5,071,997; 5,344,916 and 5,480,964 (and WO/91-01340) disclose a class of polyimides derived from BPDA and TFMB monomers that are soluble in cresol solvents.

SUMMARY OF THE INVENTION

The present invention is directed to perfluoropolyimide compositions useful in transparent, low color applications. The compositions of the present invention can be created, at least in part, by contacting a first dianhydride component with a first diamine component to provide a polyimide product represented by the formula,

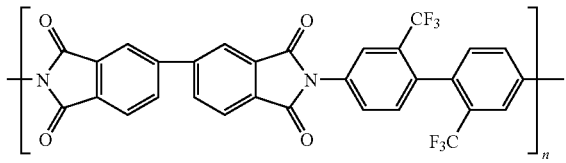

In one embodiment, the above polyimide product is a majority component (on a mole basis) of a polyimide film, where the polyimide film has an in-plane coefficient of thermal expansion (CTE) in a range between and including any two of the following: −5, −2, 0, 2, 5, 7, 10, 12, 15, 18 and 20 ppm/° C., where the film has a thickness between about 5 and 200 microns, and where the film has a average light transmittance percent in a range between and including any two of the following: 65.0, 70.0, 75.0, 80.0, 85.0, 90.0, 95.0 and 99.0 when the film is exposed to light between the wavelengths of about 380 to 770 nanometers.

DETAILED DESCRIPTION OF THE PREFERRED EMBODIMENT(S)

In one embodiment, a new class of polyimide (and copolyimide) films are provided and are derived from at least 50 mole percent (of the total polyimide) of a "Polymer Repeat Unit" derived from 3,3',4,4'-biphenyltetracarboxylic dianhydride (BDPA) and 2,2'-bis(trifluoromethyl)benzidine (TFMB) monomers. Such films have an in-plane coefficient of thermal expansion (CTE) of between −5 and +20 ppm/° C. while also having an average light transmittance percent from 65.0 to about 99.0 (when exposed to light in the wavelength range of about 380 to 770 nanometers). The Polymer Repeat Unit can be represented by the following formula,

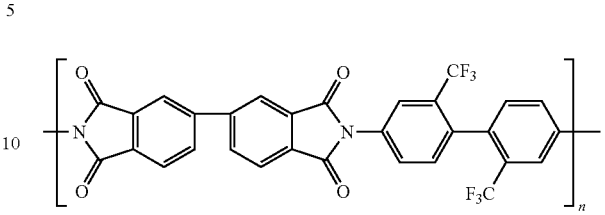

The polyimide films of the present invention are typically synthesized by a polycondensation reaction involving the reaction of the diamine and the dianhydride components. Generally, polyimides can be produced by combining together the above monomers with a solvent to form a polyamic acid solution (also called a polyamide solution or polyimide precursor material). The dianhydride and diamine components are typically combined, in a molar ratio of aromatic dianhydride component to aromatic diamine component from about 0.90 to 1.10, or from about 0.98 to 1.02. Molecular weight can be adjusted by adjusting the molar ratio of the dianhydride and diamine. As such, 'n' can be any number between 10 and 100,000, or within the range of about 100 to 1000.

In one embodiment of the present invention, a polyamic acid solution (and/or the polyamic acid casting solution) can be prepared in an organic solvent. The polyamic acid concentration can range between and including any two of the following numbers 5, 10, 12, 15, 20, 25, 27, 30, 35, 40, 45, 50, 55, 60, 65, 70, 75, 80, 85, or 90 weight-percent.

Useful organic solvents for the synthesis of the polyimides of the present invention are preferably capable of dissolving the polyimide precursor materials (e.g., monomers). Such solvents should also have a relatively low boiling point, such as below 225° C., so that the polyimide can be dried at moderate temperatures (i.e., more convenient and less costly). Typically, a boiling point of less than 210, 205, 200, 195, 190, or 180° C. is generally preferred. In general, the polyimides of the present invention are not soluble in cresol solvents or other common organic solvents mentioned below. The low CTE films of the present invention are chemically converted from their polyamic acid state to a polyimide prior to their use into downstream applications.

Solvents useful in preparing the polyimides of the present invention (i.e., in dissolving the their polyamic acid precursors) may be used alone or in combination with other solvents (i.e., cosolvents). Useful organic solvents include: N-methylpyrrolidone (NMP), dimethylacetamide (DMAc), N,N'-dimethyl-formamide (DMF), dimethyl sulfoxide (DMSO), tetramethyl urea (TMU), N,N'-dimethyl-N,N'-propylene urea (DMPU), and gamma-butyrolactone. In one embodiment, preferred solvents include N-methylpyrrolidone (NMP) and dimethylacetamide (DMAc).

Co-solvents can also be used generally at about five to 50 weight-percent of the total solvent. Useful co-solvents include xylene, toluene, benzene, diethyleneglycol diethyl ether, 1,2-dimethoxyethane (monoglyme), diethylene glycol dimethyl ether (diglyme), 1,2-bis-(2-methoxyethoxy)ethane (triglyme), bis[2-(2-methoxyethoxy)ethyl]ether (tetraglyme), bis-(2-methoxyethyl)ether, tetrahydrofuran, butyl cellosolve, butyl cellosolve acetate, propylene glycol methyl ether and propylene glycol methyl ether acetate.

The dianhydride component found to be useful in the present invention comprises at least 50 mole percent 3,3',4,4'-biphenyl tetracarboxylic dianhydride (BPDA) of the total dianhydride component. BPDA monomer may be used alone (i.e., at a 100% mole ratio of the total dianhydride component) or can be used in combination with one or more other dianhydrides of a select group disclosed herein. These additional dianhydrides, used alone or in combination with one another, can make up no more than 50 mole percent of the total dianhydride component. The additional dianhydrides may be selected from a group consisting of 4,4'-oxydiphthalic anhydride (ODPA); 4,4'-(4,4'-isopropylidenediphenoxy) bis(phthalic anhydride) (BPADA); 2,3,3',4'-biphenyl tetracarboxylic dianhydride; 2,2',3,3'-biphenyl tetracarboxylic dianhydride; 4,4'-(hexafluoroisopropylidene) diphthalic anhydride (6FDA); diphenylsulfonetetracarboxylic dianhydride (DSDA); 4,4'-bisphenol A dianhydride; 1,2,3,4-cyclobutanetetracarboxylic acid dianhydride; (−)-[1S*,5R*,6S*]-3-oxabicyclo[3.2.1]octane-2,4-dione-6-spiro-3-(tetrahydrofuran-2,5-dione) [i.e., (−)-DAN, manufactured by JSR Corp.] and bicyclo[2.2.2]oct-7-ene-2,3,5,6-tetracarboxylicdianhydride and cycloaliphatic dianhydrides. Other useful dianhydrides include 9,9-disubstituted xanthenes. These dianhydrides include, but are not limited to, 9,9-bis-(trifluoromethyl)xanthenetetracarboxylic dianhydride (6FCDA); 9-phenyl-9-(trifluoromethyl)xanthenetetracarboxylic dianhydride (3FCDA); 9,9-diphenyl-2,3,6,7-xanthenetetracarboxylic dianhydride (PPXDA); 9,9-diphenyl-2,3,6,7-tetramethylxanthene (TMPPX); 9,9-diphenyl-2,3,6,7-xanthenetetracarboxylic Bis(p-anisidylimide); 9,9-diphenyl-2,3,6,7-xanthenetetracarboxylic Bis(butylimide); 9,9-diphenyl-2,3,6,7-xanthenetetracarboxylic Bis(p-tolylimide); 9-phenyl-9-methyl-2,3,6,7-xanthenetetracarboxylic dianhydride (MPXDA); 9-phenyl-9-methyl-2,3,6,7-xanthenetetracarboxylic Bis(propylimide); 9-phenyl-9-methyl-2,3,6,7-xanthenetetracarboxylic Bis(p-tolyimide); 9,9-dimethyl-2,3,6,7-xanthenetetracarboxylic dianhydride (MMXDA); 9,9-dimethyl-2,3,6,7-xanthenetetracarboxylic Bis(propylimide); 9,9-dimethyl-2,3,6,7-xanthenetetracarboxylic Bis(tolylimide); 9-ethyl-9-methyl-2,3,6,7-xanthenetetracarboxlylic dianhydride (EMXDA);); 9,9-diethyl-2,3,6,7-xanthenetetracarboxylic dianhydride (EEXDA); etc. (as disclosed in Polyimides Based on 9,9-Disubstituted Xanthene Dianhydrides, Trofimenko and Auman, Macromolecules, 1994, vol. 27, p. 1136-1146, herein incorporated by reference). Many of the above mentioned dianhydrides (if not all) can also be used in their 'tetra-acid form' (or as mono, di, tri, or tetra esters of the tetra acid), or as their diester acid halides (chlorides). In some embodiments of the present invention however, the dianhydride form is generally preferred because it is generally more reactive than the acid or the ester.

The diamine component found to be useful in the present invention comprises at least 50 mole percent 2,2'-bis(trifluoromethyl)benzidine (TFMB). In addition, the TFMB diamine monomer may be used alone (i.e., at a 100% mole ratio of the total diamine component) or in combination with one or more other diamines of a select group disclosed herein. These additional diamines, used alone or in combination with one another, can make up no more than 50 mole percent of the total diamine component. These diamines may be selected from a group consisting of trans-1,4-diaminocyclohexane (CHDA); diaminocyclooctane; tetramethylenediamine; hexamethylenediamine; octamethylenediamine; dodecamethylene-diamine; aminomethylcyclooctylmethanamine; aminomethylcyclododecylmethanamine; aminomethylcyclohexylmethanamine; 3,5-diaminobenzotrifluoride; 2-(trifluoromethyl)-1,4-phenylenediamine; 5-(trifluoromethyl)-1,3-phenylenediamine; 1,3-diamino-2,4,5,6-tetrafluorobenzene; 2,2-Bis[4-(4-aminophenoxy)phenyl]-hexafluoropropane (BDAF); 2,2-bis(3-aminophenyl) 1,1,1,3,3-hexafluoropropane; 2,2'-bis-(4-aminophenyl)-hexafluoropropane (6F diamine); 3,4'-oxydianiline (3,4'-ODA), m-phenylene diamine (MPD), 4,4-bis(trifluoromethoxy)benzidine, 3,3'-diamino-5,5'-trifluoromethyl biphenyl, 3,3'-diamino-6,6'-trifluoromethyl biphenyl, 3,3'-bis(trifluoromethyl)benzidine; 2,2-Bis[4-(4-aminophenoxy)phenyl]hexafluoropropane (4-BDAF), 4,4'-diaminodiphenyl sulfide (4,4'-DDS); 3,3'-diaminodiphenyl sulfone (3,3'-DDS); 4,4'-diaminodiphenyl sulfone; and 4,4'-trifluoromethyl-2,2'-diaminobiphenyl.

Polyimide film embodiments of the present invention generally contain greater than 50 mole % BPDA-TFMB (i.e., 3,3',4,4'-biphenyl tetracarboxylic dianhydride (BPDA)//2,2'-bis(trifluoromethyl)benzidine) in the backbone of the polyimide, and the polyimide film is preferably produced using a conversion process that is not wholly thermal in character (i.e., a wholly thermal conversion process employs only heat to cure the polyimide from its polyamic acid precursor state). In one embodiment, the polyimide film is created primarily, if not wholly, by a chemical conversion process, which tends to moderate the CTE, preventing it from becoming unduly high as can be the case with thermal conversion.

In one embodiment, the polyimide films of the present invention comprise greater than 50 mole % BPDA-TFMB (3,3',4,4'-biphenyl tetracarboxylic dianhydride (BPDA)//2,2'-bis(trifluoromethyl)benzidine) reaction product in the polyimide backbone, where conversion to the polyimide is done with a 'chemical conversion' process. The resulting film will generally have both low CTE (i.e., less than about 20 ppm/° C.) as wells as good light transmittance (i.e., greater than about 65% on a 3-mil (75-micron) film basis).

In one embodiment of the present invention, the dianhydrides (or diamines) used to form the polyimides disclosed herein can optionally comprise a reactive end group(s). Some of these reactive end groups can be nadic, acetylene, n-propargyl, cyclohexene, maleic, n-styrenyl, phenylethynyl. These reactive end groups can be used to end cap the polymer to either form a lower molecular weight polymer or to assist in crosslinking the polymer in order to decrease the final CTE of the polyimide. Additional crosslinking of the polymer can increase the Tg and mechanical modulus of the final polyimide. In some instances, when a low molecular weight polymer is formed (i.e., an oligomer) the polymer can be crosslinked to a relatively high degree to form a polyimide with exceptional resistance to solvent attack.

Useful methods for producing polyimide films using a chemical conversion method (i.e., a method in accordance with the present invention) can be found in U.S. Pat. Nos. 5,166,308 and 5,298,331 which are incorporated by reference into this specification for all teachings therein.

The polyimides of the present invention may be prepared using a variety of different methods with respect to how the components (i.e., the monomers and solvents) are introduced to one another. Numerous variations of producing a polyamic acid solution include:

(a) a method wherein the diamine components and dianhydride components are preliminarily mixed together and then the mixture is added in portions to a solvent while stirring.

(b) a method wherein a solvent is added to a stirring mixture of diamine and dianhydride components. (contrary to (a) above)

(c) a method wherein diamines are exclusively dissolved in a solvent and then dianhydrides are added thereto at such a ratio as allowing to control the reaction rate.

(d) a method wherein the dianhydride components are exclusively dissolved in a solvent and then amine components are added thereto at such a ratio to allow control of the reaction rate.

(e) a method wherein the diamine components and the dianhydride components are separately dissolved in solvents and then these solutions are mixed in a reactor.

(f) a method wherein the polyamic acid with excessive amine component and another polyamic acid with excessive dianhydride component are preliminarily formed and then reacted with each other in a reactor, particularly in such a way as to create a non-random or block copolymer.

(g) a method wherein a specific portion of the amine components and the dianhydride components are first reacted and then the residual diamine components are reacted, or vice versa.

(h) a method wherein the components are added in part or in whole in any order to either part or whole of the solvent, also where part or all of any component can be added as a solution in part or all of the solvent.

(i) a method of first reacting one of the dianhydride components with one of the diamine components giving a first polyamic acid. Then reacting the other dianhydride component with the other amine component to give a second polyamic acid. Then combining the amic acids in any one of a number of ways prior to film formation.

Generally speaking, a polyamic acid casting solution can be derived from any one of the polyamic acid solution preparation methods disclosed above.

The polyamic acid casting solutions of the present invention comprises both a polyamic acid solution combined with some amount of conversion chemicals. The conversion chemicals found to be useful in the present invention include, but are not limited to, (i) one or more dehydrating agents, such as, aliphatic acid anhydrides (acetic anhydride, etc.) and aromatic acid anhydrides; and (ii) one or more catalysts, such as, aliphatic tertiary amines (triethylamine, etc.), aromatic tertiary amines (dimethylaniline, etc.) and heterocyclic tertiary amines (pyridine, picoline, isoquinoilne, etc.). The anhydride dehydrating material is typically used in a slight molar excess of the amount of amide acid groups present in the polyamic acid solution. The amount of acetic anhydride used is typically about 2.0-3.0 moles per equivalent of the polyamic acid. Generally, a comparable amount of tertiary amine catalyst is used. Surprising, inventors found that if a chemical conversion process is used (i.e., instead of the more common thermal process), a polyimide film is formed having a desirable (i) in-plane CTE, (ii) glass transition temperature, and (iii) light transmission coefficient over films converted using a thermal process having the same composition. The EXAMPLES, COMPARATIVE EXAMPLES and Table of data included herein describe this phenomenon in detail.

As used herein, a 'thermal conversion' process is intended to mean a process whereby no conversion chemicals (i.e., no chemical catalysts) are used to convert a polyamic acid casting solution to a polyimide (i.e., whereby only thermal energy is used to heat the film to both dry the film of solvent and to perform an imidization reaction).

The polyamic acid solutions of the present invention (and/or casting solutions) can optionally further contain any one of a number of additives. Such additives can be used as processing aids (e.g., oligomers), antioxidants, light stabilizers, light extinction coefficient modifier, flame retardant additives, anti-static agents, heat stabilizers, ultraviolet light absorbing agents, inorganic fillers or various reinforcing agents.

In accordance with the present invention, the additional monomers can be used to form the polyimide films and can be specifically chosen to provide important physical attributes to the film. Beneficial properties commonly sought include, but are not limited to, high and/or low modulus, good mechanical elongation, a low coefficient of in-plane thermal expansion (CTE), a low coefficient of humidity expansion (CHE), and a particular glass transition temperature (Tg).

Generally, a solvated mixture (i.e., a polyamic acid casting solution including the conversion chemicals mentioned above) can be cast or applied onto a support (such as an endless belt or rotating drum) to give a film. Next, the solvent containing-film (a gel film) can be converted into a self-supporting polyimide film by baking at an appropriate temperature (i.e., chemical curing) to produce a dry film. The film can then be separated from the support before complete drying and can be molecularly oriented with additional curing via a tentering oven. A cured polyimide film, for purposes of the present invention, is intended to mean a polyimide wherein at least 90, 92, 94, 96, 98, 99 or 99.9 percent of the amic-acid moieties are converted to imide moieties. Dry film, as used herein, is defined as a film wherein there is less than 2, 1.5, 1.0, 0.5, 0.1, 0.05, and 0.01 weight-percent volatile (e.g., solvent) remaining in the polyimide film composite.

In one embodiment of the present invention, a polyimide film is made having a thickness of between, and including, any two of the following numbers 5, 7, 8, 9, 10, 12, 14, 16, 18, 20, 25, 30, 35, 40, 45, 50, 55, 60, 65, 70, 75, 80, 85, 90, 95, 100, 125, 150, 175 and 200 microns.

In one embodiment of the present invention, a polyimide film is made having a particular range of glass transition temperatures (Tg). The glass transition temperature values of the polyimide films of the present invention were determined using a TA Instruments 2980 dynamic mechanical analyzer. The Tg measurement method used a sampling frequency of about 1.0 Hz (an amplitude of about 10.0 μm) and a pre-load force of about 0.01 N. A temperature ramp rate of about 5° C. $\min^{-1}$ was used. The Tg was measured at the peak of the tan δ response. Useful glass transition temperatures of the films of the present invention were found to be between and including any two of the following numbers, 250, 275, 300, 325, 350, 375, 400, 425, 450, 475 and 500° C.

In one embodiment of the present invention, a polyimide film can be made having a particular range of in-plane coefficient of thermal expansion (CTE) numbers. The in-plane CTE of polyimide films of the present invention were measured using a TA Instruments TMA 2940 thermal mechanical analyzer. The expansion of a film was measured between about 50° C. and about 250° C. on a second pass. The expansion was then divided by the temperature difference (and sample length) to obtain the CTE in ppm $°C.^{-1}$. The first pass was used to remove shrinkage from the sample over the same temperature range as well as to dry out the sample (from absorbed water). As such, the second pass then provided a CTE value characteristic of the film's inherent properties (e.g., minus water absorption and the effect water would have on a film's CTE). This method employed a 0.05 N load force and operated within the above-mentioned temperature range ramping temperature at a rate of about 10° C. $\min^{-1}$. The in-plane CTE values of many useful polyimide films of the present invention were found to be between and including any two of the following numbers, −5, 0, 2, 4, 6, 8, 10, 12, 14, 16, 18 and 20 ppm/° C.

In one embodiment, polyimide films of the present invention can be suitable as a replacement for glass in an electronic display device, provided that the polyimides have suitable light transmittance properties. Light transmittance of the polyimide films of the present invention was measured over a range between and including about 380 nanometers to about 770 nanometers (at an interval of about 2 nanometers using a Hewlett Packard 8452A Spectrophotometer). Useful average light transmittance percents of the polyimides of the present invention were found to be between and including any two of the following numbers 65.0, 70.0, 75.0, 80.0, 85.0, 90.0, 95.0 and 99.0 when these film were exposed to light between the wavelengths of about 380 to 770 nanometers.

In one embodiment of the present invention, the polyimide films herein disclosed can be useful as a component in a liquid crystal display (LCD). In general, liquid crystal display (LCD) devices require very low consumption of electrical power. These devices can also require lightweight materials of construction that are planar (flat) for the viewing surface. These attributes can allow LCD's to be used in display devices such as wristwatches, pocket calculators and personal computers, PDA, aircraft cockpit displays, and many other applications.

In its simplest form a liquid crystal display device typically consist of a liquid crystal layer having two opposite sides, a set of electrodes on either side of the liquid crystal layer, and an alignment layer between each set of electrodes and the liquid crystal layer. The electrodes bearing the alignment layer are supported by substrates typically constructed of glass or plastic. Alignment of the liquid crystal molecules occurs at a certain angle (referred to as the surface tilt angle or simply as the 'tilt angle') with respect to the plane of the inside two substrates (e.g., the glass plates, plastic sheets, quartz plates or other alignment layers supporting the electrodes). The alignment layers (i.e., these substrates) can have coatings (sets of transparent electrodes or electrical conductors) typically made of indium-tin oxide (ITO). These sets of electrodes can be patterned (e.g., by etching) to be compatible with the information to be displayed by the LCD. Displays using a TN or STN effect typically use electrodes on opposite sides of the liquid crystal layer in order to achieve a predominantly vertical electrical field that can be required for the switching of the liquid crystals in varying display modes. This TN effect can be widely exploited in a so called 'active matrix TN display', a display featuring electronic active switching elements (e.g., TFTs or diodes) in each pixel. TN-displays are already widely used, for example in monitors for laptop computers.

Another display mode in an LCD can be an in-plane-switching (IPS) mode. Here the electrodes of one pixel are on the same side of the liquid crystal layer and switching is achieved by an essentially horizontal electrical field (i.e., an electrical field that can be essentially parallel to the liquid crystal layer). IPS displays are frequently addressed by a matrix of active elements (typically of TFTs).

In one embodiment of the present invention, the polyimides disclosed can be used as an alignment layer in a display device. The process of establishing an organic-based (e.g., polyimide) alignment layer is most easily carried out by applying the polymer via a solution-casting step (e.g., spin coating, roller coating, dipping, spraying, printing and/or doctor blading) onto a substrate (e.g., glass or silicon). After removal of solvent and/or curing of the polymer, the polymer substrate can typically be rubbed or buffed in one direction with cloths to establish a unique optical direction. In some instances, the opposite side of the substrate can have a barrier passivation layer. After rubbing the substrate, the substrate can then be rotated from 0 to 360 degrees with respect to another polymer substrate. In other instances, these layers can be adhered to one another using organic adhesives. Oftentimes spacers are used to preserve a constant thickness gap between the substrates. In other instances, these substrates can be filled with various mixtures of liquid crystal materials. Also, polarizing films and/or compensation films can oftentimes be attached to the outside surfaces of the substrates by a lamination process. Finally, electrical connections are made to both substrates in a manner consistent with the electrical and display designs. Presently the use of rubbed polymer films (i.e., alignment direction and tilt angle controlling films) dominates known process technologies used in the production of all categories of liquid crystal displays. As such, polyimide based films can be used as a flexible, low cost, reliable alignment film.

In another embodiment of the present invention, the polyimide films herein disclosed can be useful as a component in an organic electronic device having an organic light emitting diode (OLED). Organic electronic devices play an important role in industry. For example, organic light emitting diodes (OLEDs) are promising for many display applications due to their high power conversion efficiency and relatively low processing costs. Such displays are especially promising for battery-powered, portable electronic devices, including cellphones, personal digital assistants, handheld personal computers, and DVD players. These applications call for displays with high information content, full color, and fast, video rate response time in addition to low power consumption.

The term "organic electronic device" or sometimes "electronic device" is herein intended to mean a device including one or more organic semiconductor layers or materials. An organic electronic device includes, but is not limited to: (1) a device that converts electrical energy into radiation (e.g., a light-emitting diode, light emitting diode display, diode laser, or lighting panel), (2) a device that detects a signal using an electronic process (e.g., a photodetector, a photoconductive cell, a photoresistor, a photoswitch, a phototransistor, a phototube, an infrared ("IR") detector, or a biosensors), (3) a device that converts radiation into electrical energy (e.g., a photovoltaic device or solar cell), (4) a device that includes one or more electronic components that include one or more organic semiconductor layers (e.g., a transistor or diode), or any combination of devices in items (1) through (4).

OLEDs typically contain organic electroluminescent (EL) material layers arranged between an anode and a cathode. Like other organic electronic devices, an OLED may contain other active materials such as buffer layers and charge transport layers. The EL materials can be small molecule materials, such as fluorescent dyes and organometallic complexes, or can be larger molecule materials such as conjugated polymers and oligomers. Each EL or active material layer contributes to the overall performance of the display.

Layers making up an OLED device are generally formed on a substrate. The term "substrate" is intended to mean a base material that can be either rigid or flexible and can include one or more layers made of one or more materials. These materials can include, but are not limited to, glass, polymer, metal or ceramic materials or combinations thereof. The substrate may or may not include electronic components, circuits, or conductive members.

The layers of the device can be formed by any conventional deposition technique, including vapor deposition, liquid deposition (continuous and discontinuous techniques), and thermal transfer. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen-printing.

Polymer films used for this application are typically required to exhibit high thermal stability while maintaining a colorless appearance. More often than not, the display devices can be designed to support 'full color' in the transmitted or reflected spectrum. Therefore, the low color nature of these polymer films is essential. In addition, new 'flexible display' applications require flexible thin film transistor (TFT) backplanes. As such, traditional glass substrates (used for the TFT backplane) must be replaced with a flexible, transparent organic film. One problem generally associated with using polymer films in these type applications is that amorphous silicon thin film transistors (on glass for display applications) are typically processed between 300° C. and 350° C. These processing temperatures are generally too high for many plastics including poly(ethylene terephthalate) and poly(ethylene naphthalate) (plastics that typically have $T_g$'s of about 70° C.-100° C. and about 120° C. respectively). In addition, higher processing temperatures (in the range of about 250° C.-275° C.) can be required to decrease leakage (the loss of current that can make it impossible to store data on a pixel capacitor over a display time frame) and increase mobility of TFTs. Low mobility typically can limit the brightness of an OLED. As such, colorless polyimide films can be an ideal substrate (i.e., a material having a $T_g \geq 280°$ C.). Similar considerations are true for making LCD displays in that the processing temperatures for active TFT types can also be in the range of about 250° C. to 275° C.

Transparent conductors are an essential component in many optoelectronic devices. These devices include, but are not limited to, displays, touch screens, and photovoltaics (e.g., solar cells). Indium tin oxide (ITO) can be used as a conductor in these type devices. Composite films of conducting polymer, optionally comprising carbon nanotubes as the electrically conductive medium, can be a replacement of a metal oxide. As such, these type composite films can be suitable for use in a flexible display. Zinc oxide and doped zinc oxide films can be used as an alternative to ITO films because zinc oxide generally non-toxic and, inexpensive. Finally the films of the present invention can be used as a clear protective filter for cameras.

EXAMPLES

The advantages of the present invention are illustrated in the following non-limiting Examples. The processing and test procedures used in the preparation and testing of the polyimide films are described below. Each EXAMPLE and COMPARATIVE EXAMPLE was prepared having a thickness of about 75 microns (~3.0 mils). If 25-micron thick samples would be prepared, in accordance with the present invention, light transmittance numbers could exceed greater than 90.0. Polyamic acid precursor materials (the precursors to making the polyimide films) were allowed to equilibrate to obtain their final viscosity.

Other film properties of the films of the present invention, and properties of their corresponding precursor materials, were measured as follows. Solution viscosity of the polyamic acids of the present invention was measured using a Brookfield HADV-II+ Viscometer equipped with a #5 spindle operating at a speed of about 20 rpm. Young's Modulus, tensile strength, and film elongation were measured using an Instron Model 1122 Series IX Automated Materials Testing System version 8.10.00. Crosshead speed was set to about 1.0 inch/min. using a 100.0 lbf load cell. Polyimide film dimensions were about 3.0 mil (about 150 microns) thick by 0.5" (about 12.7 mm) wide for each test strip. The instrument used a 1.0" jaw opening. Testing conditions were performed at about 73° C. and about 50% relative humidity.

Example 1

Into a dried 500 milliliter three-necked round bottom flask, equipped with nitrogen inlet, mechanical stirrer, and thermometer was placed 38.43 g (0.12 moles) of 2,2'-bis(trifluoromethyl)benzidine (TFMB) and 334 milliliter of N,N-dimethylacetamide (DMAc).

The mixture was heated and stirred at 45° C. for several minutes until the diamine had completely dissolved resulting in a straw colored solution. Next, 26.47 g (0.09 moles) of 3,3',4,4'-biphenyltetracarboxylic dianhydride (BPDA) and 13.326 g (0.03 moles) of 4,4'-(hexafluoroisopropylidene) diphthalic anhydride (6FDA) were added to the diamine solution (the reaction vessel). Stirring was continued until all of the solids dissolved and the reaction formed a polyamic acid solution. The solution was decanted and stored at 0° C. until used for film casting.

A polyimide film derived from the above polyamic acid (BPDA/6FDA//TFMB) was chemically imidized through the use of a catalytic solution. The chemically imidized film was prepared by casting the polymer onto a sheet of DuPont MYLAR® film. The polymer (and support sheet) was immersed into a catalytic solution comprising a 1:1 ratio of acetic anhydride and β-picoline. Within minutes (upon partial imidization), a gel film was formed. The gel film was peeled from the support sheet and transferred to a restraining frame (pin frame).

The film was then heated using a forced air oven to further imidize the polymer and remove solvent. The film was exposed to the following oven temperatures for about ½ hour, 100° C., 150° C., 200° C. and 300° C. The film was removed from the pin frame and analyzed. The data is shown in Table 1.

Example 2

A polyamic acid was prepared in accordance with EXAMPLE 1. However, instead of using a portion of 6FDA anhydride, the polymer was derived from only two monomers, 2,2'-bis(trifluoromethyl)benzidine (TFMB) and 3,3',4,4'-biphenyltetracarboxylic dianhydride (BPDA).

Into a dried 500 milliliter three-necked round bottom flask, equipped with nitrogen inlet, mechanical stirrer, and thermometer was placed 16.181 g (0.055 moles) of BPDA and 17.163 g (0.055 moles) of TFMB. The two monomers were dissolved into 131.68 milliliters of DMAc. A chemical reaction was allowed to occur thus forming a polyamic acid solution. The solution was decanted and stored at 0° C. until used for film casting.

A polyimide film derived from the above prepared polyamic acid (BPDA//NTFMB) was chemically imidized through the use of a catalytic solution. The chemically imidized film was prepared by casting the polymer onto a sheet of DuPont MYLAR® film. The polymer (and support sheet) was immersed into a catalytic solution comprising a 1:1 ratio of acetic anhydride and β-picoline. Within minutes (upon partial imidization), a gel film was formed. The gel film was peeled from the support sheet and transferred to a restraining frame (pin frame).

The film was then heated using a forced air oven to further imidize the polymer and remove solvent. The film was exposed to the following oven temperatures for about ½ hour, 100° C., 150° C., 200° C. and 300° C. The film was removed from the pin frame and analyzed. The data is shown in Table 1.

Example 3

A polyamic acid was prepared in accordance with EXAMPLE 1. However, instead of using a portion of 6FDA anhydride, the polymer was derived from three monomers, 2,2'-bis(trifluoromethyl)benzidine (TFMB), 3,5-diaminobenzotrifluoride (DABTF) and 3,3',4,4'-biphenyltetracarboxylic dianhydride (BPDA).

Into a dried 500 milliliter three-necked round bottom flask, equipped with nitrogen inlet, mechanical stirrer, and thermometer was placed 24.658 g (0.077 mole) TFMB and 5.911 g (0.033 mole) 3,5-diaminobenzotrifluoride (DABTF). The two monomers were dissolved into 252.6 milliliters of DMAc. Next, 32.362 g (0.11 mole) BPDA was added and dissolved. A chemical reaction was allowed to occur thus forming a polyamic acid solution. The solution was decanted and stored at 0° C. until used for film casting.

A polyimide film derived from the above prepared polyamic acid (BPDA//TFMB/DABTF) was chemically imidized through the use of a catalytic solution. The chemically imidized film was prepared by casting the polymer onto a sheet of DuPont MYLAR® film. The polymer (and support sheet) was immersed into a catalytic solution comprising a 1:1 ratio of acetic anhydride and β-picoline. Within minutes (upon partial imidization), a gel film was formed. The gel film was peeled from the support sheet and transferred to a restraining frame (pin frame).

The film was then heated using a forced air oven to further imidize the polymer and remove solvent. The film was exposed to the following oven temperatures for about ½ hour, 100° C., 150° C., 200° C. and 300° C. The film was removed from the pin frame and analyzed. The data is shown in Table 1.

Example 4

A polyamic acid was prepared in accordance with EXAMPLE 1. However instead, the polymer was derived from three monomers, 2,2'-bis(trifluoromethyl)benzidine (TFMB), trans-1,4-diaminocyclohexane (CHDA), and 3,3',4, 4'-biphenyltetracarboxylic dianhydride (BPDA).

Into a dried 500 milliliter three-necked round bottom flask, equipped with nitrogen inlet, mechanical stirrer, and thermometer was placed 12.52 g (0.04 mole) TFMB and 0.79 g (0.007 mole) of trans-1,4-diaminocyclohexane (CHDA). The two monomers were dissolved into 114 milliliters of DMAc. Next, 13.5 g (0.046 mole) BPDA was added and dissolved. A chemical reaction was allowed to occur thus forming a polyamic acid solution. The solution was decanted and stored at 0° C. until used for film casting.

A polyimide film derived from the above prepared polyamic acid (BPDA//TFMB/CHDA) was chemically imidized through the use of a catalytic solution. The chemically imidized film was prepared by casting the polymer onto a sheet of DuPont MYLAR® film. The polymer (and support sheet) was immersed into a catalytic solution comprising a 1:1 ratio of acetic anhydride and β-picoline. Within minutes (upon partial imidization), a gel film was formed. The gel film was peeled from the support sheet and transferred to a restraining frame (pin frame).

The film was then heated using a forced air oven to further imidize the polymer and remove solvent. The film was exposed to the following oven temperatures for about ½ hour, 100° C., 150° C., 200° C. and 300° C. The film was removed from the pin frame and analyzed. The data is shown in Table 1.

Comparative Example 1

A 2,000-poise viscosity polyamic acid was prepared in accordance with EXAMPLE 1. The polymer was cast and converted to a polyimide film using a thermal method (i.e., no catalytic chemicals were used).

The polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

Comparative Example 2

A 3,100-poise viscosity polyamic acid was prepared in accordance with EXAMPLE 2 (BPDA//TFMB). The polymer was cast and converted to a polyimide film using a thermal method (i.e., no catalytic chemicals were used).

The polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

Comparative Example 3

A 2,300-poise viscosity polyamic acid was prepared in accordance with EXAMPLE 2 (BPDA//TFMB/DABTF). The polymer was cast and converted to a polyimide film using a thermal method (i.e., no catalytic chemicals were used).

The polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

Comparative Example 4

A polyamic acid was prepared in accordance with EXAMPLE 1. However, instead of using a portion of BPDA anhydride only 6FDA was used. The diamine employed was 2,2'-bis(trifluoromethyl)benzidine (TFMB).

Into a dried 500 milliliter three-necked round bottom flask, equipped with nitrogen inlet, mechanical stirrer, and thermometer was placed 16.012 g (0.05 moles) of TFMB (which was allowed to dissolve) and 22.21 g (0.05 mole) of 6FDA. The amount of DMAc used was 148.93 milliliters. A chemical reaction was allowed to occur thus forming a polyamic acid solution. The solution was decanted and stored at 0° C. until used for film casting. No chemical conversion chemicals were added.

A polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

Comparative Example 5

By the same method and conditions described in COMPARATIVE EXAMPLE 4 of the present invention, 22.065 g (0.075 mole) BPDA was added to 18.622 g (0.075 mole) of 3,3'-diaminodiphenyl sulfone that was previously dissolved in 148.93 milliliters DMAc. A chemical reaction was allowed to occur thus forming a polyamic acid solution. The solution was decanted and stored at 0° C. until used for film casting. No chemical conversion chemicals were added.

A polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

Comparative Example 6

By the same method and conditions described in COMPARATIVE EXAMPLE 4 of the present invention, 22.065 g (0.075 mole) BPDA was added to 18.622 g (0.075 mole) 4,4'-diaminodiphenyl sulfone previously dissolved in 148.93 milliliter DMAc. A chemical reaction was allowed to occur thus forming a polyamic acid solution. The solution was decanted and stored at 0° C. until used for film casting. No chemical conversion chemicals were added.

A polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

Comparative Example 7

A polyimide film was prepared in accordance with EXAMPLE 1 (i.e., a chemical conversion method was used to imidized the film). However instead, the polymer was derived from four monomers, 2,2'-bis(trifluoromethyl)benzidine (TFMB), 3,4-oxydianaline (3,4-ODA), pyromellitic dianhydride (PMDA) and 3,3',4,4'-biphenyltetracarboxylic dianhydride (BPDA).

Into a dried 500 milliliter three-necked round bottom flask, equipped with nitrogen inlet, mechanical stirrer, and thermometer was placed 12.8 g (0.04 mole) TFMB and 8.0 g (0.04 mole) of 3,4-oxydianiline (3,4-ODA). The two monomers were dissolved into 169 milliliters of DMAc. Next, 14.0 g (0.046 mole) of PMDA and 4.7 g (0.16 mole) BPDA was added and dissolved.

A chemical reaction was allowed to occur thus forming a polyamic acid solution. A small amount of 6.0% by weight pyromellitic dianhydride solution in DMAc was added to the polyamic acid solution until the viscosity of the solution reached about 2,400 poise. The solution was decanted and stored at 0° C. until used for film casting.

A polyimide film derived from the above prepared polyamic acid (PMDA/BPDA//TFMB/3,4-ODA) was chemically imidized through the use of a catalytic solution. The chemically imidized film was prepared by casting the polymer onto a sheet of DuPont MYLAR® film. The polymer (and support sheet) was immersed into a catalytic solution comprising a 1:1 ratio of acetic anhydride and β-picoline. Within minutes (upon partial imidization), a gel film was formed. The gel film was peeled from the support sheet and transferred to a restraining frame (pin frame).

The film was then heated using a forced air oven to further imidize the polymer and remove solvent. The film was exposed to the following oven temperatures for about ½ hour, 100° C., 150° C., 200° C. and 300° C. The film was removed from the pin frame and analyzed. The data is shown in Table 1.

Comparative Example 8

A polyimide film was prepared in accordance with EXAMPLE 1 (i.e., a chemical conversion method was used to imidized the film). However instead, the polymer was derived from four monomers, 4,4-oxydianiline (4,4-ODA), p-phenylene diamine (PPD), pyromellitic dianhydride (PMDA) and 3,3',4,4'-biphenyltetracarboxylic dianhydride (BPDA).

Into a dried 500 milliliter three-necked round bottom flask, equipped with nitrogen inlet, mechanical stirrer, and thermometer was placed 38.4 g (0.192 mole) 4,4-oxydianiline (4,4-ODA) and 31.1 g (0.288 mole) of p-phenylene diamine (PPD). The two monomers were dissolved into 168 milliliters of DMAc. Next, 60.0 g (0.275 mole) PMDA and 56.5 g (0.192 mole) BPDA was added and dissolved.

A chemical reaction was allowed to occur thus forming a polyamic acid solution. A small amount of 6.0% by weight pyromellitic dianhydride solution in DMAc was added to the polyamic acid solution until the viscosity of the solution reached about 2,200 poise. The solution was decanted and stored at 0° C. until used for film casting.

became tack free. The dried film was then transferred onto a restraining frame (a pin frame). While on the pin frame, the film was thermally converted to a polyimide using forced hot air for about ½ hour at each of the following temperatures 100° C., 150° C., 200° C. and 300° C. The film was removed from the pin frame and analyzed. The data is shown in Table 1.

TABLE 1

(the following films were prepared having a thickness of about 75 microns)

| Example | Polyimide Type | Conversion Method | Polymer Viscosity (poise) | Tg (° C.) | CTE (ppm/° C.) | Young's Modulus (kpsi) | Tensile Strength (kpsi) | Tensile Elongation (%) | % Light Transmittance (380-770 nm) |
|---|---|---|---|---|---|---|---|---|---|
| Ex. 1 | BPDA/6FDA//TFMB | Chemical | 3200 | 330 | 9 | 569.9 | 28.2 | 35.9 | 76.07 |
| Comp 1 | BPDA/6FDA//TFMB 75/25//100 (mol %) | Thermal | 3200 | 335 | 50 | 423 | 19.9 | 12.2 | 76.83 |
| Ex. 2 | BPDA//TFMB | Chemical | 3100 | 252 | −3 | 929 | 35.9 | 37.6 | 76.01 |
| Comp 2 | BPDA//TFMB | Thermal | 3100 | 260 | 38 | 498 | 22.1 | 15.1 | 78.32 |
| Ex. 3 | BPDA//TFMB/DABTF | Chemical | 2300 | 312 | 4 | 617 | 36.2 | 64 | 75.39 |
| Comp 3 | BPDA//TFMB/DABTF 100//70/30 (mol %) | Thermal | 2300 | 318 | 46 | 443 | 20.5 | 11.7 | 78.38 |
| Ex. 4 | BPDA//TFMB/CHDA 100//85/15 (mol %) | Chemical | 950 | 274 | 1.6 | 834 | 30.3 | 29.3 | 74.3 |
| Comp 4 | 6FDA//TFMB | Thermal | 2500 | 333 | 66 | 361 | 12.4 | 8.6 | 86.36 |
| Comp 5 | BPDA//3,3'-DDS | Thermal | 50 | 267 | 50 | 393 | 17.8 | 6.8 | 74.51 |
| Comp 6 | BPDA//4,4'-DDS | Thermal | 40 | 368 | 55 | 420 | 19.5 | 5.2 | 74.91 |
| Comp 7 | PMDA/BPDA//34ODA/TFMB 80/20//50/50 (mol %) | Chemical | 2400 | 330 | 1 | 846 | 35.1 | 74 | 61.4 |
| Comp 8 | PMDA/BPDA//44ODA/PPD 58/40//40/60 (mol %) | Chemical | 2200 | 360 | 15 | 513 | 25.5 | 53.1 | 55.8 |
| Comp 9 | 6FDA/BPDA//TFMB 75/25//100 (mol %) | Thermal | 2000 | 310 | 59 | 383 | 18.9 | 9.2 | 81.4 |

A polyimide film derived from the above prepared polyamic acid (PMDA/BPDA//4,4-ODA/PPD) was chemically imidized through the use of a catalytic solution. The chemically imidized film was prepared by casting the polymer onto a sheet of DuPont MYLAR® film. The polymer (and support sheet) was immersed into a catalytic solution comprising a 1:1 ratio of acetic anhydride and β-picoline. Within minutes (upon partial imidization), a gel film was formed. The gel film was peeled from the support sheet and transferred to a restraining frame (pin frame).

The film was then heated using a forced air oven to further imidize the polymer and remove solvent. The film was exposed to the following oven temperatures for about ½ hour, 100° C., 150° C., 200° C. and 300° C. The film was removed from the pin frame and analyzed. The data is shown in Table 1.

Comparative Example 9

By the same method and conditions described in COMPARATIVE EXAMPLE 4 of the present invention (thermal conversion), 22.8 (0.90 mole) of 2,2'-bis(trifluoromethyl) benzidine (TFMB) was dissolved into 267 milliliters of DMAc. 30.0 g (0.675 mole) 6FDA and 6.6 g (0.0225 mole) BPDA was added and a chemical reaction was allowed to occur thus forming a polyamic acid solution. The solution was decanted and stored at 0° C. until used for film casting.

A polyimide film was prepared by casting the polyamic acid solution onto a 316 stainless steel plate. The polyamic acid solution was spread using an aluminum blade having a gap. The gap was set so to ensure that the final film thickness was about ~3.0 mil.

The stainless steel plate, with wet film, was then placed onto a hot plate and was heated to about 80° C. or until the film

We claim:

1. A film comprising polyimide, the polyimide comprising a repeat unit obtained by contacting a first dianhydride component and a first diamine component, the repeat unit being represented by the formula,

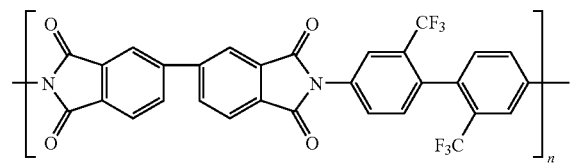

wherein n represents the number of repeating units and n is an integer between 10 and 100,000, wherein the repeat unit is present at a mole percent between and including 95 and 50 mole percent, based upon the total moles of repeat units in the polyimide film, the film further comprising a fumed filler selected from a group consisting of dicalcium phosphate, silicon dioxide, alumina, and titanium dioxide, wherein the polyimide is also derived from a second diamine component, wherein the first diamine component and the second diamine component comprising a total diamine component, wherein the second diamine component is reacted into the polyimide in an amount between and including 5 and 50 mole percent, and of the total diamine component reacted into the polyimide, and wherein the second diamine component is selected from a group consisting of trans-1,4-diaminocyclohexane and diaminocyclooctane, wherein the polyimide is also derived from a second dianhydride component wherein the first dianhydride component and the second dianhydride component comprise a total dianhydride component, wherein the second dianhydride component is incorporated into the polyimide in an amount between and including 5 and 50 mole percent of the total dianhydride component, and wherein the second dianhydride component is selected from the group consisting of 1,2,3,4-cyclobutanetetracarboxylic acid dianhydride; bicyclo[2.2.2]oct-7-ene-2,3,5,6-tetracarboxylicdianhydride; and 9,9-disubstituted xanthene dianhydrides, wherein the polyimide film has an in-plane coefficient of thermal expansion (CTE) between and including and 20 ppm/° C., wherein the polyimide has a glass transition temperature (Tg) of between and including 250° and 500° C., wherein the film has a thickness between and including and 200 microns, wherein the film has a average light transmittance percent between 65.0 and 99.0 when the film is exposed to light between the wavelengths of 380 to 770 nanometers, and wherein the film is made by a cast chemical conversion process, the process employing the use of a dehydrating agent and a catalyst to increase the rate of chemical reaction of the polyamic acid to polyimide, the process forming a gel film, said gel film being heated to further imidize the film.

2. A polymer film in accordance with claim 1 wherein the film is used as a component in an organic light emitting diode (OLED) or a liquid crystal display (LCD).

3. A laminate comprising the film of claim 1 and an indium tin oxide layer wherein the film and the indium tin oxide layer are adjacent.

4. A laminate in accordance with claim 3 wherein the laminate is formed using an indium tin oxide deposition process.

5. A laminate comprising the film of claim 1 and a passivation barrier layer wherein the film and the passivation barrier layer are adjacent and wherein a passivation barrier layer is present on one side or both sides of the film.

6. The laminate of claim 5 wherein the passivation barrier layer is an oxygen passivation layer, a vapor passivation barrier layer or both.

7. A laminate in accordance with claim 5 wherein the passivation barrier layer comprises a material having the formula $SiO_x$ or $SiN_x$ wherein X is either 2, 3 or 4.

8. A laminate in accordance with claim 5 wherein the passivation barrier layer comprises $Al_2O_3$ optionally in combination with $SiO_x$ or $SiN_x$ wherein X is either 2, 3 or 4.

9. A laminate in accordance with claim 5 wherein the passivation barrier layer is applied to the film using an atomic vapor deposition process.

10. A laminate comprising the film of claim 1 and a conductor layer wherein the conductor layer comprises a polymer having dispersed therein electrically conductive particles wherein the electrically conductive particles are selected from the group comprising carbon nanotubes, carbon powder, indium tin oxide and zinc-based oxides.

11. An electrical device comprising the film of claim 1 wherein the electrical device is selected from the group consisting of flexible liquid crystal display, a cellular phone, a personal data assistance device, a digital camera and a portable video game.

12. An electrical component comprising the film of claim 1 wherein the electrical component is used in a photovoltaic device.

13. An electrical component comprising the film of claim 1 wherein the electrical component is used in protective optical transparent filter.

* * * * *